United States Patent [19]

Nishio

[11] Patent Number: 5,050,061

[45] Date of Patent: Sep. 17, 1991

[54] APPARATUS FOR GENERATING PREDETERMINED CONTROL DATA CORRESPONDING TO AN OPERATING POSITION OF A MANUALLY OPERABLE CONTROL DEVICE OR LEVER

[75] Inventor: Naoki Nishio, Kanagawa, Japan

[73] Assignee: Sony Corporation, Tokyo, Japan

[21] Appl. No.: 332,999

[22] Filed: Apr. 4, 1989

[30] Foreign Application Priority Data

Apr. 6, 1988 [JP] Japan .................................. 63-84826

[51] Int. Cl.⁵ ..................... H03K 17/94; H03M 11/00
[52] U.S. Cl. .................................. 364/900; 364/513; 364/557; 364/577; 341/22; 318/568.1
[58] Field of Search .............. 364/513, 557, 577, 200, 364/900; 341/22; 382/8, 34, 42; 355/43, 53; 318/568.1

[56] References Cited

U.S. PATENT DOCUMENTS

| | | | |
|---|---|---|---|
| 4,260,940 | 4/1981 | Engelberger et al. | 318/568 |
| 4,362,978 | 12/1982 | Pollard et al. | 318/568 |
| 4,420,812 | 12/1983 | Ito et al. | 364/577 |
| 4,477,754 | 10/1984 | Roch et al. | 318/568 |
| 4,491,930 | 1/1985 | Hyatt | 364/518 |
| 4,628,785 | 12/1986 | Buchla | 84/689 |
| 4,686,655 | 8/1987 | Hyatt | 367/59 |
| 4,754,334 | 6/1988 | Kriz et al. | 358/345 |
| 4,813,436 | 3/1989 | Au | 356/375 |
| 4,814,829 | 3/1989 | Kosugi et al. | 355/43 |
| 4,817,022 | 3/1989 | Jornod et al. | 364/558 |
| 4,868,474 | 9/1989 | Lancraft et al. | 364/568.2 |
| 4,885,785 | 12/1989 | Reynolds et al. | 382/42 |

Primary Examiner—Stuart N. Hecker
Assistant Examiner—Pappas George C.
Attorney, Agent, or Firm—Ronald P. Kananen

[57] ABSTRACT

A system for generating control data comprises an imput component having a movable member, a position detecting component for detecting a position of the movable member and for outputting a position signal, a random access memory component for storing control data therein, a writing component for writing the control data in the random access memory component, an analog to digital converting component for converting the position signal to a digital position signal and for outputting the digital position signal as a read address, a reading component for reading out the control data from the read address of the random access memory component, and output component for outputting the control data read out from the random access memory component.

9 Claims, 6 Drawing Sheets

APPARATUS FOR GENERATING PREDETERMINED CONTROL DATA CORRESPONDING TO AN OPERATING POSITION OF A MANUALLY OPERABLE CONTROL DEVICE OR LEVER

BACKGROUND OF THE INVENTION

1. Field of the Invention

The present invention relates to a system for generating control data for outputting predetermined control data corresponding to an operating position of a manually operable control means, such as an operating lever.

2. Description of the Background Art

Figure 1:
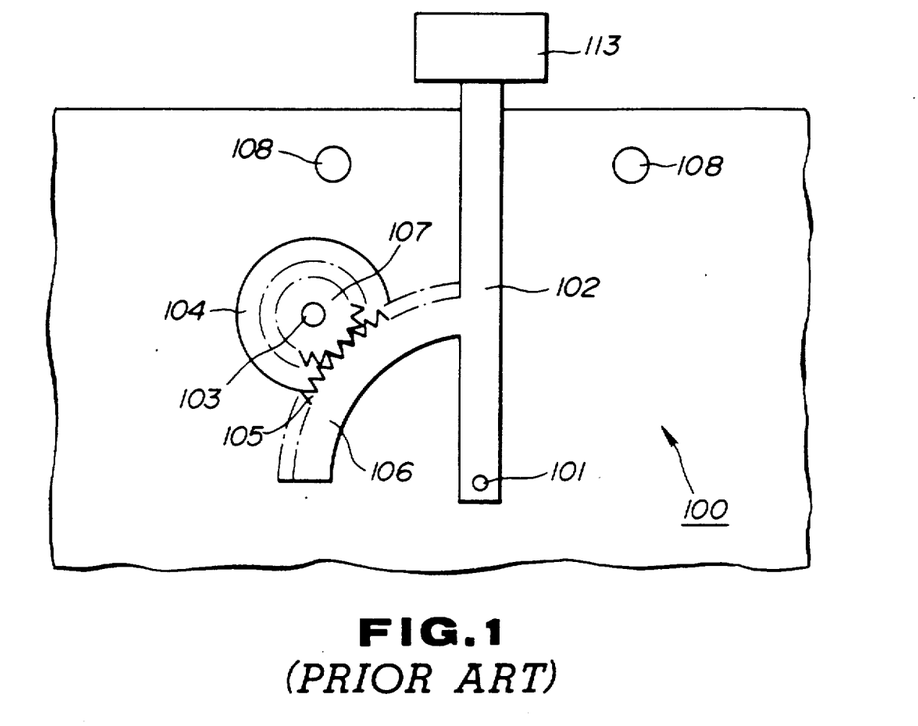
FIG. 1 is an illustration showing mechanical construction of the conventional control signal generating device.

FIG. 1 shows a conventional device for outputting a predetermined control signal in response to manual operation of a manually operable control means, such as a control lever. The device 100 shown in FIG. 1 comprises an operating lever 102 with one end rotatably fitted to a pivot 101 and a variable resistor 104 which has its electrical resistance variable as an operating shaft 103 rotates. The operating lever 102 is fitted with an arm 106 having gear teeth 105 on its circular arc centering around the pivot 101. Moreover, the variable resistor 104 is equipped with a small gear shown in engagement with the gear teeth 105 on the arm 106. A pair of stopper pins 108 are disposed at two points on the plane of pivotal movement of the operating lever 102 around the pivot 101. The orientations of the stopper pins 108 are so selected that the operating lever 102 contacts with one of the stopper pins 108 at a predetermined angular position in either of the pivoting directions. Therefore, the stopper pins 108 defines an angular range in which the operating lever 102 can be pivotally shifted.

Figure 2:
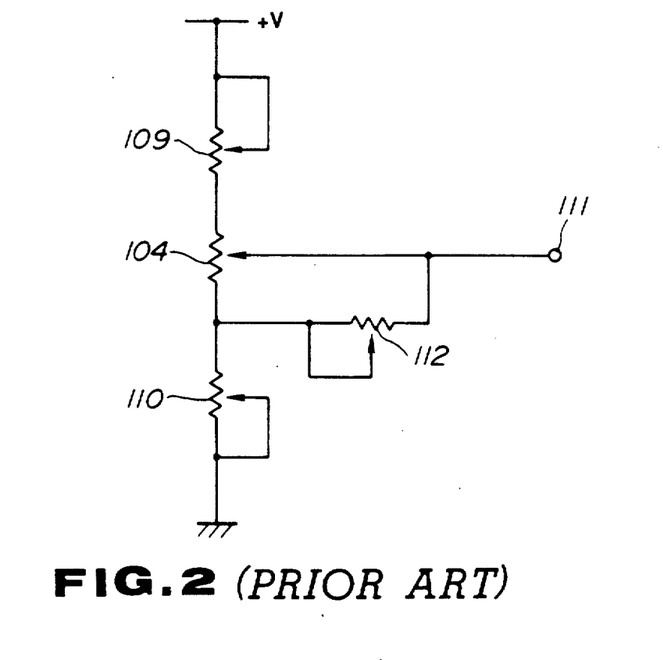
FIG. 2 is a circuit diagram of the conventional control signal generating device.

As shown in FIG. 2, the variable resistor 104 has one end connected via a first regulating variable resistor 109 to a power source +V. The other end of the variable resistor 104 is connected to the ground via a second regulating variable resistor 110. The output terminal of the variable resistor 104 is connected to a control signal output terminal 111 and also connected to the aforementioned grounded end via a third regulating variable resistor 112.

In the conventional device set forth above, when the operator shifts a handle 113 fixed to the tip end of the operating lever 102 for causing pivotal movement of the operating lever, the operating shaft 103 of the variable resistor 104 rotates. Thus, the output corresponding to the operating position of the operating lever 102 at the control signal output terminal 111 can be obtained.

The foregoing conventional device encounters various defects or drawbacks. For example, in order to obtain the predetermined output corresponding to the operating position of the operating lever, the variable resistors 109, 110 and 112 are to be precisely adjusted so as to compensate for fluctuation in the characteristics of the variable resistor 104 and for error in installation of the operating lever 102. Even by precise adjustment of the variable resistors 109, 110 and 112, it is still difficult to provide satisfactorily high precision to output the predetermined value corresponding to the angular position of the operating lever. Furthermore, because of insufficient precision in the co-relation between the angular position of the operating lever and the output, with the conventional device it is difficult to set a plurality of angular positions at which mutually different outputs are to be obtained.

SUMMARY OF THE INVENTION

Therefore, it is an object of the present invention to provide a novel control data generating system which can provide output precisely corresponding to an operating position of a manually operable input means.

Another object of the invention is to provide a control data generating system which is free from secular variation of components and can stably provide output precisely corresponding to the operating position of the input means.

A further object of the invention is to provide a control data generating system in which the output data, corresponding to operating position of an input means, can be changed.

In order to accomplish the aforementioned and other objects, a system for generating control data comprises an input means having a movable member, a position detecting means for detecting a position of the movable member and for outputting a position signal, a random access memory means for storing control data therein, a writing means for writing the control data in the random access memory means, an analog to digital converting means for converting the position signal to a digital position signal and for outputting the digital position signal as a read address, a reading means for reading out the control data from the read address of the random access memory means, and output means for outputting the control data read out from the random access memory means.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 3:
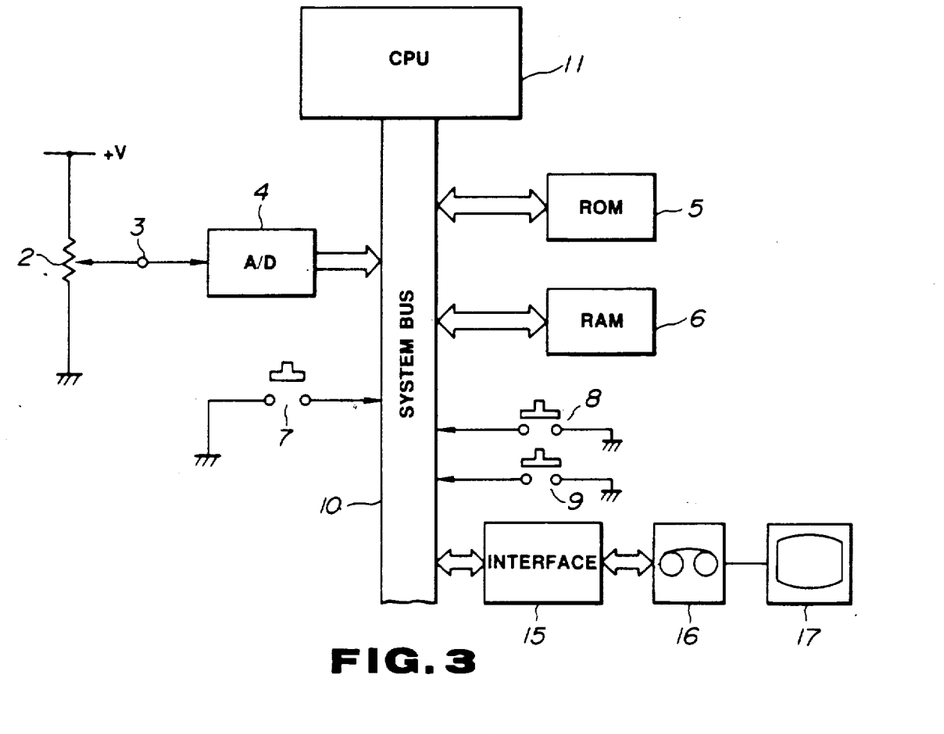
FIG. 3 is a block diagram of the preferred embodiment of a control data generating system according to the present invention, which control data generating system is illustrated in a form applied to a variable speed reproduction system in a video tape recorder system.

Referring now to the drawings, particularly to FIG. 3, there is illustrated a schematic block diagram of the preferred embodiment of a control data generating system 1 according to the present invention. In FIG. 3, the control data generating system 1 comprises an analog-to-digital (A/d) converter 4 which is connected to a variable output 3 of a variable resistor 2, a read-only memory (ROM) 5, a random-access memory (RAM) 6, a rewriting commanding switch 7 and the up/down switches 8 and 9. The A/D converter 4, ROM 5, RAM 6, the rewriting commanding switch 7 and the up/down switches 8 and 9 are connected to a central processing unit (CPU) 11 via a system bus 10.

The variable resistor 2 has one end connected to a power source +V and the other end connected to the ground. The variable resistor 2 is so arranged that the electrical resistance thereof varies according to shifting of a handle 13 fixed to the tip end of an operating lever 12, for instance in a direction indicated by arrow A in FIG. 4. Variation of the electrical resistance of the variable resistor 2 can be set in a linear fashion according to a shifting magnitude of the operating lever 12. The variable resistor 2 also outputs a lever position indicative signal having a variable valve depending upon the operating position of the operating lever 12. In order to implement the function set forth above, a similar construction as that employed in the conventional device 100 set forth above, can be employed. Namely, in such case, the variable resistor 2 is provided with a rotary shaft which is rotated for varying the resistance, and gear teeth on the rotary shaft mesh with a gear assembly which is rotatingly driven by means of the operating lever.

Figure 4:
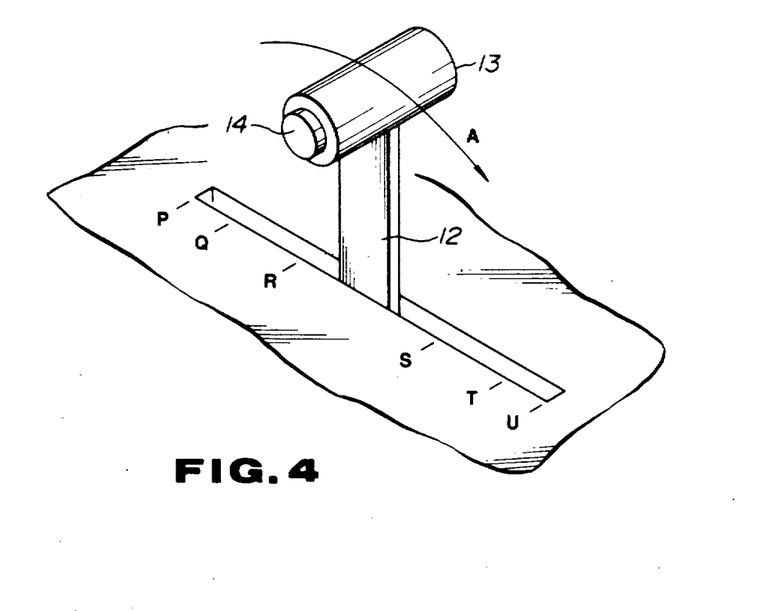
FIG. 4 is a perspective view of an operating lever employed in the preferred embodiment of the control data generating system of FIG. 3.

The handle is fitted with a lock release bottom 14 at a position where the thumb of the operator touches the same. The operator is, thus, able to change the range of movement of the operating lever 12 by operating the lock release button in such a manner that:

when the operating lever is operated without pressing the lock release button 14, it moves within a predetermined range from a position R to a position S, including a mid-point within the range of movement from the position P to U, shown in FIG. 2, and mechanically stops at the position R or S;

when the lock release button 14 is pressed, the lock state at the position R or S is released and the lever is allowed to move within the predetermined range between a position Q and a position T including the positions R and S; and when a greater operating force is exerted on the handle 13 to move the handle with the operating lever while the lock release button 14 is depressed, the lever 12 further shifts from the position Q to a position P or from the position T to a position U while the force is exerted, and the lever returns from the position P to the position Q or from position U to the position T when the force is released.

It should be appreciated that limiting the shifting range of the operating lever between the positions R and S can be done by means of a limiter pin which is variable for the position between a locking position, in which the shifting range is limited, and an unlocking position in which the operating lever is permitted to shift in a range between the position Q and the position T. The limiter pin per sen and mechanical construction for operating the limiter pin between the locking position and unlocking position by means of the lock release button are known technologies. Therefore, it is not necessary to provide a detailed discussion for them. On the other hand, the mechanical construction for permitting the operating lever from the position R to the position P and from S to T can be formulated in any known constructions, such as that by means of a friction plate which produces torque reacting on the operational force. Since the construction is known, it is not necessary to give further detailed discussion.

The position detection signal derived from the variable output 3 corresponding to the position of the operating lever 12 is converted into a digital signal by an A/D converter 4 and is supplied to a CPU 11 via the system bus 8. The CPU 11 reads the output data in the A/D converter 4 and supplies the data to a RAM 6.

Figure 5:
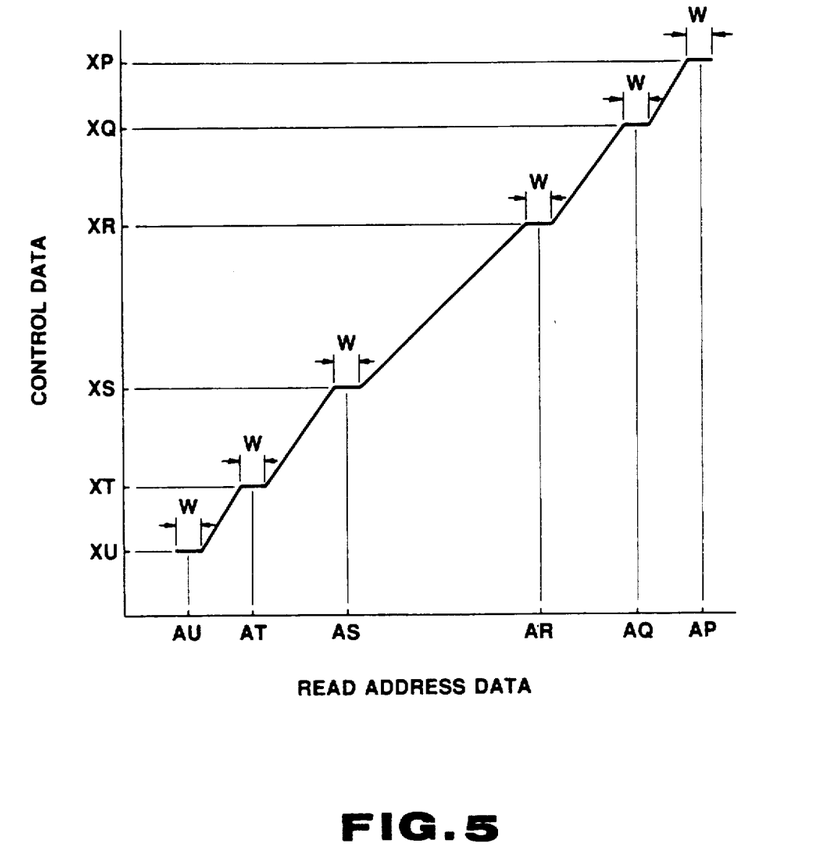
FIG. 5 is an illustration of a data table formed in a RAM in the preferred embodiment of the control data generating system of the invention.

The RAM 6 has a data table for storing control data. The control data of the data table increases as illustrated in FIG. 5 according to an increase of the address data. The manner of setting the control data in the data table will be discussed later. Control data stored in the data table of the RAM 6 is accessed under the control of the CPU 11 and by identifying an address by the address data. Control data read from the RAM 6 is supplied to an external device which is to be controlled, via the system bus 10 and an interface 15. In the embodiment of FIG. 3, the external device comprises a video tape recorder (VTR). In this case, the control data controls reproduction speed of the VTR 16. The output of the VTR 16 is fed to a monitor 17 for reproduction.

Writing and reading of data in and from RAM 6 is controlled by a control program which is stored in ROM 5 and executed by CPU 11.

In FIG. 5, AP, AQ, AR, AS, AT and AU indicated on the abscissa axis represent the address data for identifying a RAM address to access at respective operating positions P, Q, R, S, T and U of the operating lever 12. On the other hand, XP, XQ, XR, XS, XT and XU indicated on the ordinate axis represent predetermined control data stored in respective RAM addresses AP, AQ, AR AS, AT and AU corresponding to the respective operation positions P, Q, R, S, T and U of the operating lever. In addition, in a predetermined stroke range W set about the respective operating positions P, Q, R, S, T and U, the control data are held constant at XP, XQ, XR, XS, XT and XU. This compensates for mechanical error in the setting of the operating positions which can be caused during assembly. Namely, as long as the positions of the operation lever at respective operating positions can be maintained within a predetermined tolerance, the desired control data precisely corresponding to the operating position of the operating lever can be obtained.

A description will subsequently by given for application of the preferred embodiment of the control data generating system 1 to the VTR for controlling reproduction speed. The control data XS is read out when the operating lever 12 is shifted to operating position S. At this operating position, still image reproduction is commanded. The control data XR is read out when the operating level 12 is shifted to the position R. This commands normal speed reproduction (x 1). When the operating lever 12 is operated from the position S in the direction of arrow A (i.e. toward the positions T and U), the control data is output for commanding reverse reproduction at reproduction speed variable depending upon the shifting position of the operating lever 12. On the other hand, when the operating lever 12 is shifted from the position S to the direction opposite to the arrow A (i.e. toward the positions R, Q, P), the control data is output for forward reproduction at speeds variable depending upon the operating lever position. When the operating lever 12 is set at the positions, P, Q, R, S, T and U, the control data commanding the respectively corresponding reproducing direction and reproducing speed can be produced.

A process for updating the data table in RAM 6 will be discussed hereinafter. The necessity updating of the control data may be caused by the following two causes. The first one is that the voltage at the output of the variable resistor 2 varies to be inconsistent with the predetermined value corresponding to the operating lever position due to secular variation. Assuming that the operating lever 12 is set at the position S, the address data becomes AS to identify the corresponding RAM address to access, and thus the control data XS commanding still image reproduction has to be read out. However, due to secular variation, it is possible that despite the operating lever being at position S, the output of the A/D converter 4 can become different from AS. This can be caused by offset from the position S due to secular variation. As long as the offset from the position S is within the range W, the control data XS can be read out. When the offset from the position S is substantial, the control data read in response to the operating lever position S becomes different from XS, to undesirably cause slow forward or reverse reproduction. For avoiding this, it becomes necessary to change the contents of the data table in RAM 6. Furthermore, it is also possible to update the contents of the data table in the factory before sending it to market so as to compensate for fluctuation of the characteristics of individual variable resistors the capability of updating or changing the contents of the data table is further useful for maintaining the control data to be generated according to the shift or operating position of the operating lever, at a value precisely corresponding to the desired value. Particularly, when the deadband stroke W of the operating lever cannot be set in a satisfactorily wide range, such a capability of updating of the data table is useful for maintaining precise consistency between the operating lever position and the control data to be generated.

Figure 6:
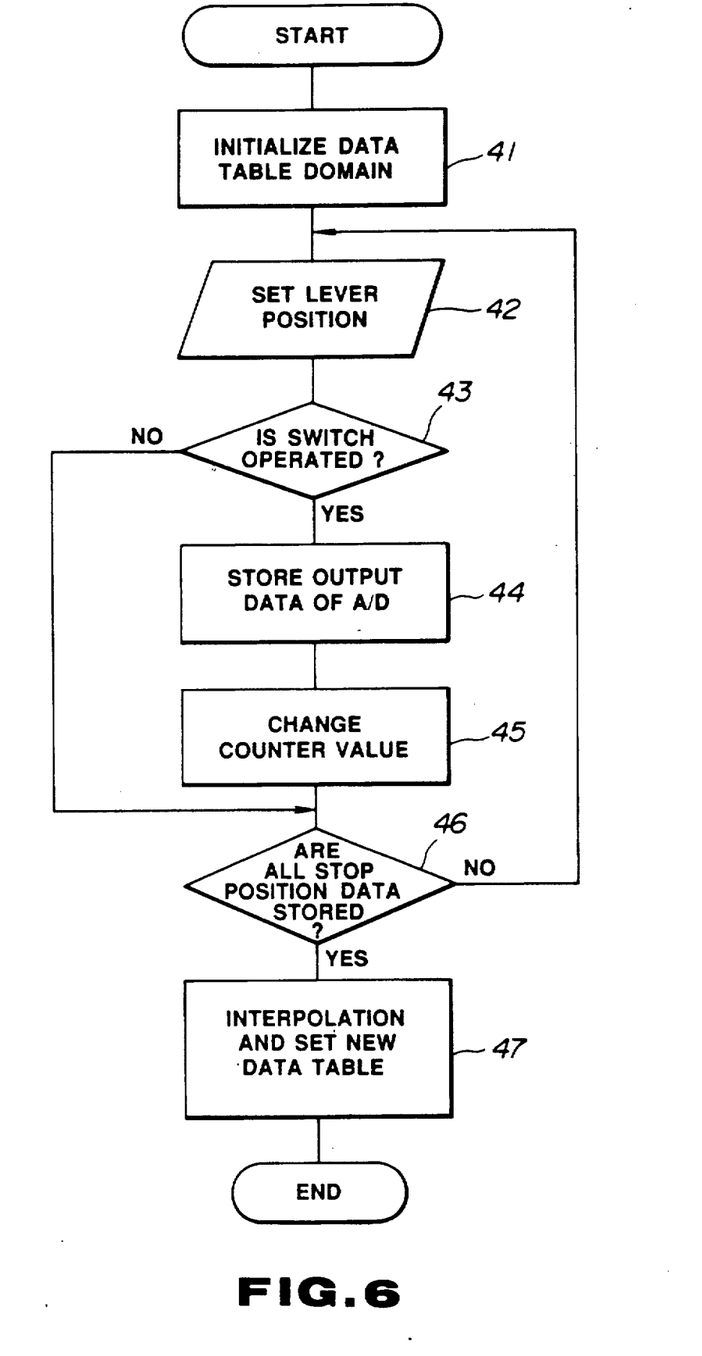
FIGS. 6 and 7 are flowcharts showing processes for updating a data table performed by the preferred embodiment of the control data generating system according to the invention.

FIG. 6 shows a flowchart implementing the formation of the data table for storing the control data. The shown program is triggered by depression of the rewrite commanding switch 7. In response to depression of the rewrite commanding switch 7, the CPU 11 reads out the program of FIG. 6 to execute it. Immediately after starting execution, initialization is performed for initializing the predetermined addresses of the domain of RAM 6 to form the data table, as indicated at step 41. Then, also in the step 41, a number corresponding to the number of operating lever positions is set. The number for each position is then derived by subtracting one from the number currents set in the counter. For the shown embodiment, the number to be set at the step 41 for the operating positions P, Q, R, S, T and U becomes 5. According to shifting of the operating lever, the counter value varies among 5, 4, 3, 2, 1, 0 which respectively represent operating positions P, Q, R, S, T and U.

Then, the operating lever 12 is set at the position P, at the step 42. By positioning the operating lever 12 at the position P, the A/D converter 4 outputs address data indicative of the operating lever position P. When no mechanical error is contained in the operating lever positioning mechanism, the address data to be produced, in response to setting the operating lever at the position P, becomes AP. On the other hand, when address data is different from AP and has a value AP' due to secular variation or other cause, the rewrite commanding switch 7 is depressed. Then, the answer required at the step 43 becomes affirmative (YES). When the answer at the step 43 is affirmative, the address data AP' generated by the A/D converter 4 is set as the address data AP representative of the operation position P of the operating lever 12, at the step 44. Setting of the updated address data is performed by storing the updated address data value in a memory area provided for the corresponding address data AP. Thereafter, the counter value of the counter is decremented by 1, at the step 45. Therefore, after the first cycle of the updating process, the counter value becomes 4 to indicate the operating position Q.

Thereafter, a check is performed as to whether the address data for all of the operating positions are updated or not, at the step 46. Until all address data of all operating positions P, Q, R, S, T and U are updated, the process returns to the step 42 to repeat the foregoing process. As will be appreciated herefrom, by repeating the process through the steps 42 to 46, all the address data AP, AQ, AR, AS, AT and AU are updated by the outputs AP', AQ', AR', AS', AT' and AU' of the A/F converter 4. Then, the contents of the data table XP, XQ, XR, XS, XT and XU are adapted to be read out by the updated address data in the step 47. At the same time, interpolation for deriving the control data for the operating lever positions intermediate between the specific operating positions P, Q, R, S, T and U is performed. Though the process set forth above, the data table is updated, in the step 47.

Figure 7:
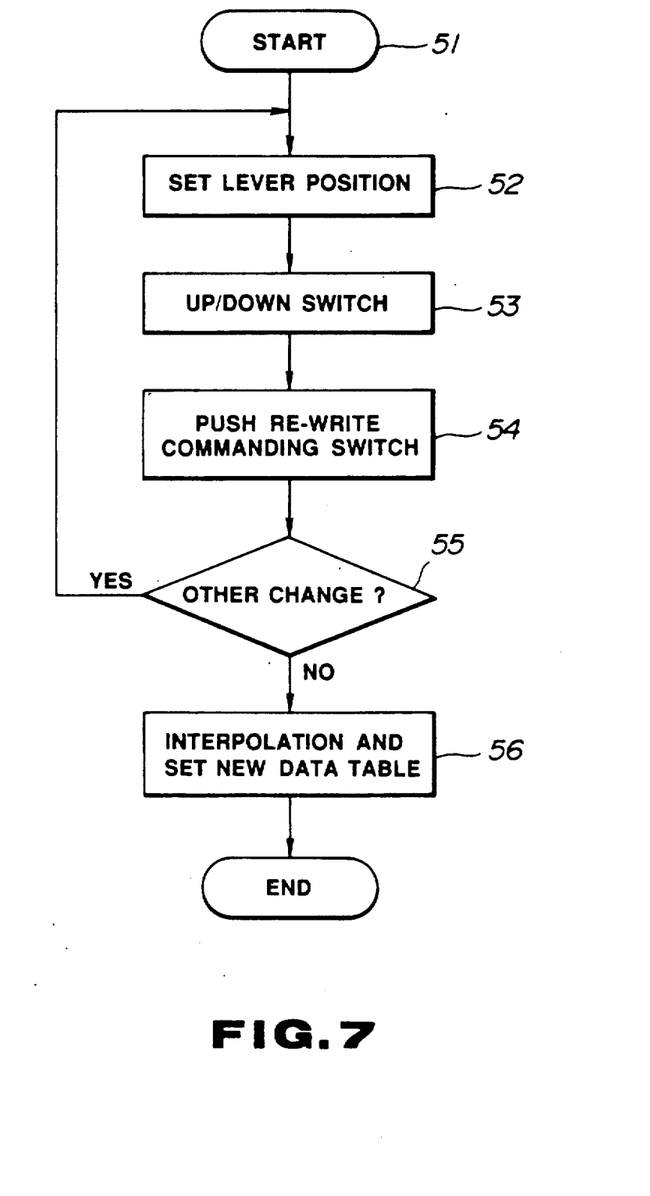

Though the process set forth above shows an example for updating the data table by updating the address data while maintaining the control data XP, XQ, XR, XS, XT and XU at respectively fixed values, it is also possible to vary the control data. FIG. 7 shows the process for updating control data in relation to the shift position of the operating lever.

Immediately after starting execution at the step 51 of the program of FIG. 7, the operating lever 12 is shifted to any desired position, at the step 52. Then, reproduction of the video signal is performed a at a speed ordered by the corresponding control data. The operator observes the monitor 17 to adjust the reproduction speed to a desired speed by means of the up/down switches 8 and 9, at the step 53. The function of adjustment of the reproduction speed while maintaining the operation lever 12 at a fixed position involves changing the control data at a specific address identified by the fixed value of the access data. When the desired reproduction speed is obtained through the operation of adjustment of the reproduction speed at the step 53, the rewrite commanding switch 7 is operated. In response to operation of the rewrite commanding switch 7, the control data corresponding to the selected reproduction speed is stored as the control data at the selected operating position of the operating lever 12, at the step 54.

At the step 55, a check is performed as to whether updating of the control data for other operating position is required or not. If the answer at the step 55 is affirmative (YES), the process returns to the step 52 to repeat the control data updating process through the steps 52 to 55. On the other hand, when the answer at the step 55 becomes negative (NO), which means that all control data at all desired operating positions are updated, then interpolation is performed for deriving interpolated control data for the shift positions of the operating lever between the specific operating positions.

Figure 8:
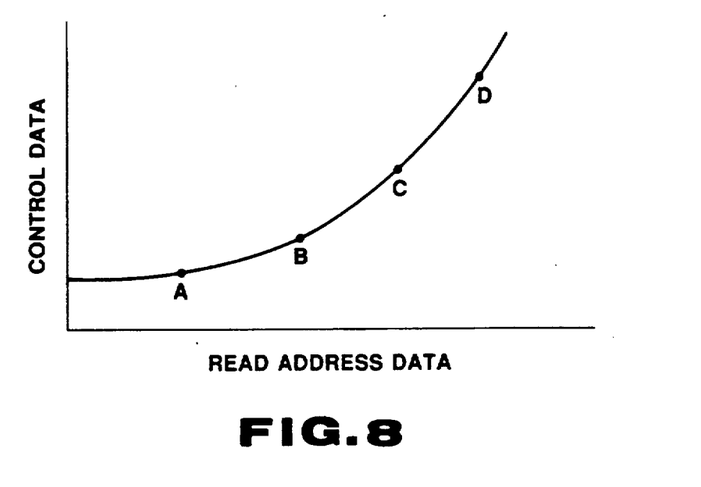
FIGS. 8, 9A and 9B are illustrations of data tables formed in the RAM in the preferred embodiments of the control data generating system of the invention.
Figure 9A:
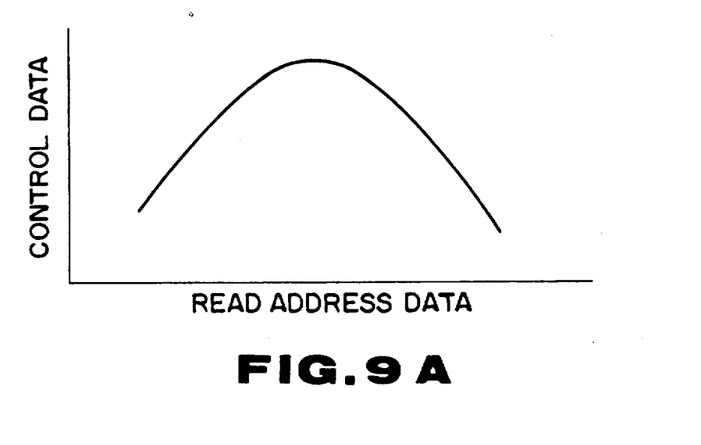
Figure 9B:
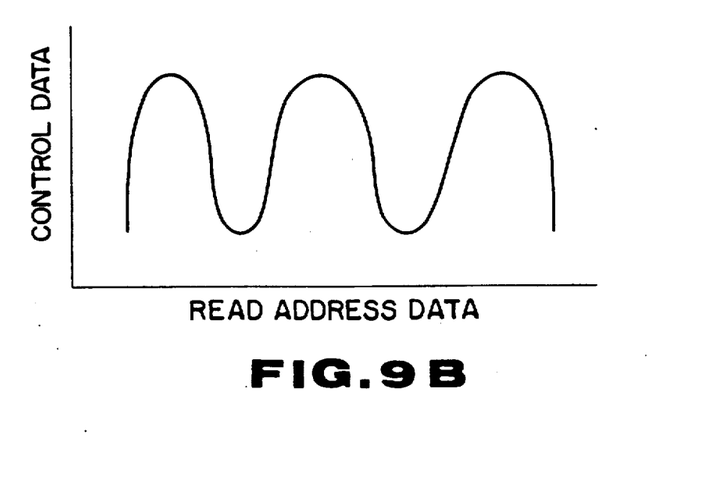

In either of the cases set forth above, interpolation can be done by utilizing linear characteristics, quadratic characteristics on so forth. FIG. 8 shows a manner of interpolation utilizing quadratic characteristics after determining points A, B, C, D. Since the lever position and the corresponding data can be set in any manner, various relationships between the lever position and the corresponding data can be set. FIGS. 9A and 9B show examples of other relationships between the lever position and the corresponding control data.

In the preferred embodiment, RAM 6 is connected to a back-up power source. Therefore, RAM 6 can maintain written data even after termination of the power supply through the main power supply.

The control data generating system 1 is thus capable of forming the data table of the control data to correspond to the operating position of the operating lever 12 through the above-mentioned simple processes. The operating lever position indicative data which is converted to a digital data by the A/D converter 4 serves as the address data for reading out the control data. As can be seen from the discussion given hereabove, since the operating-lever-position indicative data, i.e., address data, correspond to each other in a precise manner, the shown embodiment of the control data generating system can generate precisely corresponding control data XP, XQ, XR, XS, XT and XU. Therefore, control of the operation according to the operating lever shifting position can be precisely performed.

Furthermore, according to the shown embodiment, since the adjustment of the relationship between the control data and the address data is possible, it becomes unnecessary to provide variable resistors for compensating the fluctuation of the characteristics of the variable resistor. Thus, it becomes unnecessary to avoid mechanical error occurring during assembly of the operating lever. This permits simplification of the construction of the control data generating system.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment employs the operating lever for commanding access of various addresses, it may be possible to replace the lever with a dial. Also, though the shown embodiment utilizes a digital form of control data for controlling the external device, it is of course, possible to provide a digital-to-analog (D/A) converter for controlling the device by an analog signal. In addition, it should be noted though the shown embodiment employs the specific illustrated processes, it is possible to use any other processes which are suitable for updating the address data and/or the control data.

What is claimed is:

1. A system for generating control data comprising:
   a movable member movable within a plurality of predetermined positions;
   position detecting means for detecting said plurality of predetermined positions of said movable member and outputting a respective position signal depending on the predetermined position of said movable member;
   converting means for converting each said position signal to a respective digital position signal, and for outputting said digital position signal corresponding to a current predetermined position of said movable member as a read address, whereby said plurality of predetermined positions correspond to a plurality of read addresses;
   memory means for storing a plurality of control data in a range of respective read addresses therein, and for storing in a further memory area said read addresses from said converting means in a selected correspondence with said range of respective read addresses of said plurality of control data;
   writing means for writing into said further memory area, in an adjustment mode when said movable member is successively placed at said predetermined positions, each respective one of said read addresses when said movable member is at the respective predetermined positions, in said correspondence to the respective one of said read addresses of said memory means at which the respective control data is stored;
   interpolation means for interpolating, in said adjustment mode after said writing into said further memory area of said read addresses corresponding to said predetermined positions, between said read addresses of said memory means of said desired control data corresponding to said predetermined positions;
   reading means for reading out said control data from said read addresses of said memory means; and
   output means for outputting said control data read out from said memory means;
   wherein, after completion of an adjustment of said adjustment mode, a respective desired one of said control data is output for each predetermined position of said movable member.

2. A system for generating control data according to claim 1, wherein said control data is output as a function of said predetermined position of said movable member in a manner that for an incremental range about each said predetermined position the same respective control data is output, so that the output of said output means is constant at the respective control data value for any predetermined position of said movable member within each said incremental range.

3. A system for generating control data according to claim 1, wherein said movable member is a lever for controlling the speed of a VTR, said predetermined positions of said lever define respective speed control ranges, including high and low speed control ranges for both forward and reverse speeds, and said movable member includes further mechanical means which must be operated before said lever can be moved between respective ones of said speed control ranges.

4. A system for generating control data according to claim 1, which further comprises a writing initiation switch for initiating the writing operation by said writing means during said adjustment mode.

5. A device for providing a desired correspondence between the position of a movable member and the value of a resulting control output, said device comprising:

first means including 1) said movable member, 2) reference means for defining a range of positions of said movable member within said first means, 3) means for providing a position-indicating signal for any position of said movable member in said range, and 4) means for digitizing said position-indicating signal and outputting the resulting digitized signal; and second means for receiving said digitized signal and outputting said desired corresponding control output, including a memory means having a plurality of control data stored at respective addresses therein, wherein respective ones of said control data are read out from said addresses to provide said control output, said addresses of said memory means being selected in correspondence to said digitized signal output from said first means;

wherein said first means includes reference marks indicating positions of said movable member at which respective ones of said control data are desired to be output, and said second means includes means for achieving the goal 1) of establishing that the respective desired control data is output when said movable member is at each said reference mark, said means for establishing the goal of establishing involving changing data stored in said second means, and the goal 2) of establishing by an automated process following the achieving of the goal 1) that the respective desired control data is output when said movable member is at each other position.

6. The device of claim 5, wherein:

said control data are retained at the addresses of said memory means into which they are first written; and said second means operates such that said goal 1) is achieved by establishing an address-to-address translation table, for translating between each value of said digitized signal and the corresponding one of said addresses of said memory means from which the respective control data is to be read out.

7. The device of claim 6, wherein said second means operates such that said establishing of said address-to-address translation table occurs by:

first placing said movable member successively at each said reference mark, and making the corresponding entry into said address-to-address translation table while said movable member is at each said reference mark; and subsequently completing said address-to-address translation table by interpolation.

8. The device of claim 7, wherein said second means is such that said subsequent completing of said address-to-address translation table is by an interpolation selected from linear or quadratic interpolation.

9. The device of claim 5, wherein said second means is such that said control data are written into said addresses of said memory means given by said digitized signal when said movable member is placed in succession at said reference marks; and said control data are written into the other ones of said addresses of said memory means using an interpolation process.

* * * * *